(12) United States Patent
Li et al.

(10) Patent No.: US 11,748,250 B2
(45) Date of Patent: Sep. 5, 2023

(54) METHOD AND ELECTRONIC DEVICE FOR DATA PROCESSING, AND STORAGE MEDIUM

(71) Applicant: Beijing Horizon Robotics Technology Research and Development Co., Ltd., Beijing (CN)

(72) Inventors: Jianjun Li, Beijing (CN); Meng Yao, Beijing (CN); Zhenjiang Wang, Beijing (CN); Yu Zhou, Beijing (CN)

(73) Assignee: Beijing Horizon Robotics Technology Research and Development Co., Ltd., Beijing (CN)

( * ) Notice: Subject to any disclaimer, the term of this patent is extended or adjusted under 35 U.S.C. 154(b) by 19 days.

(21) Appl. No.: 17/536,475

(22) Filed: Nov. 29, 2021

(65) Prior Publication Data

US 2022/0197786 A1 Jun. 23, 2022

(30) Foreign Application Priority Data

Dec. 18, 2020 (CN) .......................... 202011511725.9

(51) Int. Cl.
*G06F 12/02* (2006.01)
*G06N 3/063* (2023.01)

(52) U.S. Cl.
CPC .............. *G06F 12/02* (2013.01); *G06N 3/063* (2013.01)

(58) Field of Classification Search
CPC .......... G06N 3/063; G06N 3/08; G06F 12/02; G06F 12/023; G06F 3/0656; G06F 2212/1044; G06F 9/544; G06F 3/0679; G06F 3/064; G06F 12/0246
USPC .................. 711/103, 200, E12.001, E12.002
See application file for complete search history.

(56) References Cited

U.S. PATENT DOCUMENTS

2019/0004980 A1* 1/2019 Maor ....................... G06F 16/10
2021/0182077 A1* 6/2021 Chen ......................... G06T 1/60

* cited by examiner

*Primary Examiner* — Sanjiv Shah
*Assistant Examiner* — Edward Waddy, Jr.
(74) *Attorney, Agent, or Firm* — Bret E. Field; Bozicevic, Field & Francis LLP

(57) ABSTRACT

This application discloses a data processing method and apparatus, an electronic device, and a storage medium. When execution is performed at an operation layer of a neural network model, based on a pre-stored buffer allocation relationship, a first address range for cyclic addressing is set for a first buffer corresponding to input data and a second address range for cyclic addressing is set for a second buffer corresponding to an output result. Subsequently, cyclic addressing can be performed in the first buffer based on the first address range for cyclic addressing, to read the input data for the operation layer; and cyclic addressing can be performed in the second buffer based on the second address range for cyclic addressing, to write the output result of the operation layer into the second buffer. In this way, efficiency of buffer utilization can be effectively improved, and further operation efficiency for the model is improved.

14 Claims, 6 Drawing Sheets

METHOD AND ELECTRONIC DEVICE FOR DATA PROCESSING, AND STORAGE MEDIUM

CROSS-REFERENCES TO RELATED APPLICATION

The present application claims priority to Chinese patent application No. 202011511725.9, filed on Dec. 18, 2020, which is incorporated herein by reference in its entirety as set forth in full.

FIELD OF THE INVENTION

This application relates to the field of data storage technology, and in particular, to a data processing method and apparatus, an electronic device, and a storage medium.

BACKGROUND OF THE INVENTION

With development of science and technology, artificial intelligence (AI) is applied more widely. From machine learning to deep learning, such as a neural network model, an amount of involved data and an amount of operation are greatly increased, which brings in a greater test to hardware such as a processor. Time consumed by an AI processor in accessing (including reading and writing) data is an important factor that affects operation efficiency. To improve data access efficiency, in the AI processor, an SRAM (static random-access memory) buffering mechanism is generally used to buffer feature data or weight data involved in an AI model. However, capacity of a buffer is usually limited. Therefore, how to efficiently use the buffer with limited capacity to store data is a very important issue, which may directly affect execution efficiency of the entire processor.

SUMMARY OF THE INVENTION

This application is proposed to resolve the foregoing technical problem. Embodiments of this application provide a data processing method and apparatus, a processor, a device, and a medium. Through flexibly setting a cyclic addressing range of feature data involved in an operation layer of a neural network model, utilization efficiency of a buffer is effectively improved, and operation efficiency for the model is further improved.

According to a first aspect of this application, a data processing method is provided, where the method includes: when execution is performed at an operation layer of a neural network model, setting a first address range for cyclic addressing of a first buffer and a second address range for cyclic addressing of a second buffer based on a pre-stored buffer allocation relationship, where the first buffer is a buffer corresponding to input data for the operation layer, the second buffer is a buffer corresponding to an output result of the operation layer, the buffer allocation relationship includes a correspondence of feature data of the operation layer to a corresponding buffer and a corresponding cyclic addressing range in the buffer, and the feature data includes the input data and the output result; performing cyclic addressing in the first buffer based on the first address range for cyclic addressing, to read the input data for the operation layer; executing an operation instruction corresponding to the operation layer to process the read input data, to obtain an output result; and performing cyclic addressing in the second buffer based on the second address range for cyclic addressing, to write the output result into the second buffer.

According to a second aspect of this application, a data processing apparatus is provided, where the apparatus includes: a cyclic addressing setting module, configured to set, when execution is performed at an operation layer of a neural network model, a first address range for cyclic addressing of a first buffer and a second address range for cyclic addressing of a second buffer based on a pre-stored buffer allocation relationship, where the first buffer is a buffer corresponding to input data for the operation layer, the second buffer is a buffer corresponding to an output result of the operation layer, the buffer allocation relationship includes a correspondence of feature data of the operation layer to a corresponding buffer and a corresponding cyclic addressing range in the buffer, and the feature data includes the input data and the output result; a reading module, configured to perform cyclic addressing in the first buffer based on the first address range for cyclic addressing, to read the input data for the operation layer; a processing module, configured to execute an operation instruction corresponding to the operation layer to process the read input data, to obtain an output result; and a writing module, configured to perform cyclic addressing in the second buffer based on the second address range for cyclic addressing.

According to a third aspect of this application, a processor is provided, including an operating unit and one or more buffers, where the one or more buffers are all connected to the operating unit, and the operating unit is configured to implement the data processing method provided in the foregoing first aspect.

According to a fourth aspect of this application, an electronic device is provided, including a processor, where the processor includes an operating unit and one or more buffers; and a memory, where the memory stores a computer program instruction, and the operating unit, when executing the computer program instruction, is enabled to implement the data processing method provided in the foregoing first aspect.

According to a fifth aspect of this application, a computer readable storage medium is provided, where the storage medium stores a computer program, and the computer program is used to implement the data processing method provided in the foregoing first aspect.

According to the data processing method and apparatus, the processor, the device, and the medium that are provided in the embodiments of this application, when execution is performed at the operation layer of the neural network model, based on the pre-stored buffer allocation relationship, the first address range for cyclic addressing of the first buffer corresponding to the input data and the second address range for cyclic addressing of the second buffer corresponding to the output result are respectively set. Subsequently, cyclic addressing may be performed in the first buffer based on the first address range for cyclic addressing, to read the input data for the operation layer; and cyclic addressing may be performed in the second buffer based on the second address range for cyclic addressing, to write the output result of the operation layer into the second buffer. According to the pre-stored buffer allocation relationship, buffers corresponding to the input data for and the output result of each operation layer of the neural network model and a cyclic addressing range in the buffer may be flexibly configured. In this case, different feature data, for example, the input data for and the output result of a same operation layer or the input data and the output results of different operation layers, shares a same buffer. In this way, utilization efficiency of the buffer may be effectively improved, and operation efficiency for the model may be further improved.

BRIEF DESCRIPTION OF THE DRAWINGS

By describing the embodiments of this application more detailed with reference to the accompanying drawings, the foregoing and other objectives, features, and advantages of this application will become more apparent. The accompanying drawings are provided for further understanding of the embodiments of this application, constitute a part of the specification, are used to explain this application together with the embodiments of this application, and do not constitute limitation to this application. In the accompanying drawings, same reference numerals generally represent same components or steps.

DETAILED DESCRIPTION OF THE EMBODIMENTS

Exemplary embodiments of this application are described below in detail with reference to the accompanying drawings. Obviously, the described embodiments are merely a part, rather than all of embodiments of this application. It should be understood that this application is not limited by the exemplary embodiments described herein.

Application Overview

Due to limited capacity of a buffer, how to efficiently use the buffer with limited capacity to store data may affect execution efficiency of an entire AI processor. Generally, an amount of feature data that needs to be accessed for an AI model is relatively large, which exceed storage capacity of the buffer, in most cases. Therefore, to improve utilization efficiency of the buffer, the feature data may be split first, and then the feature data may be stored through simulating a nearly infinite storage space by the limited buffer capacity by means of cyclic addressing. However, the inventor found through long-term researches that regarding a prior cyclic addressing scheme, as for a same buffer, a cyclic addressing range is simplex and fixed, and restrictions for storing a plurality of different feature data to an SRAM port of a same cyclic addressing range are stricter, thus greatly limiting utilization efficiency of cyclic addressing of the buffer.

Figure 1:
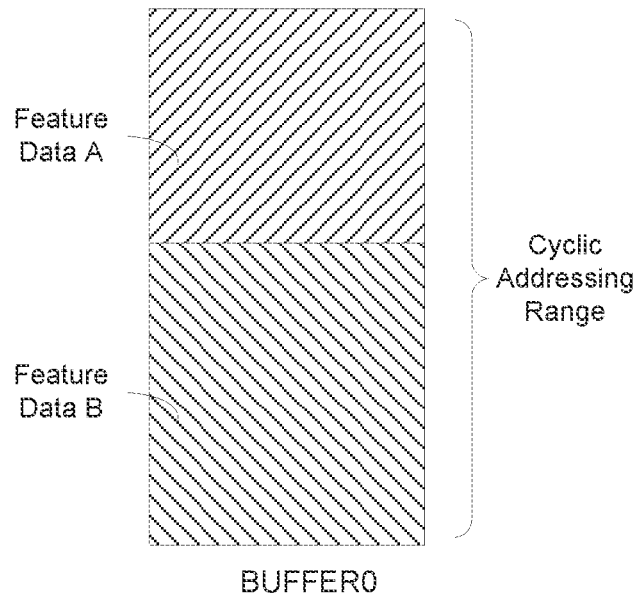
FIG. 1 is a schematic diagram of an exemplary buffer according to an embodiment of this application.

It may be understood that if a plurality of different feature data are directly stored to an SRAM port of a same cyclic addressing range at the same stage, for feature data with different sizes or different growth rates, overwriting may occur among different feature data. For example, as shown in FIG. 1, when feature data A and feature data B are successively stored in a buffer BUFFER0 of a same cyclic addressing range at a same stage, if a data amount of the feature data B is greater than that of the feature data A, or a growth rate of the feature data B is greater than that of the feature data A, the feature data A may be overwritten with the feature data B, which may result in an error in the read feature data A and further an error in an operation result.

In view of the above, an embodiment of this application provides a data processing method, where the method includes: when execution is performed at an operation layer of a neural network model, setting a first address range for cyclic addressing of a first buffer and a second address range for cyclic addressing of a second buffer based on a pre-stored buffer allocation relationship; and then performing cyclic addressing in the first buffer based on the first address range for cyclic addressing, to read input data for the operation layer; subsequently, executing an operation instruction corresponding to the operation layer to process the read input data, to obtain an output result; and performing cyclic addressing in the second buffer based on the second address range for cyclic addressing, to write the output result into the second buffer. The first buffer is a buffer corresponding to the input data for the operation layer. The second buffer is a buffer corresponding to the output result of the operation layer. The buffer allocation relationship includes a correspondence of feature data of the operation layer to a corresponding buffer and a corresponding cyclic addressing range in the buffer. The feature data includes the input data and the output result.

The foregoing data processing process may not be restricted by a cyclic addressing range that is originally simplex and fixed. Based on the pre-stored buffer allocation relationship, the input data and the output result are included in the feature data of the operation layer of the neural network model are flexibly configured with both corresponding buffers and the cyclic addressing range in the buffer, respectively. For example, a user may configure the buffer allocation relationship as required, to allocate a plurality of different feature data to a same buffer. Moreover, corresponding cyclic addressing ranges in the buffer do not overlap with each other, so that different feature data, such as, input data and an output result of a same operation layer or input data and output results of different operation layers, shares a same buffer. In this way, utilization efficiency of the buffer can be effectively improved and operation efficiency for the model can be further improved, without consideration of restrictions from the size or the growth rate of the feature data.

After the basic principles of this application are introduced, various non-limiting embodiments of this application are described in detail below with reference to the accompanying drawings. It should be noted that the buffer, as a noun, described in this application refers to a high-speed memory, such as an SRAM.

Exemplary Method

Figure 2:
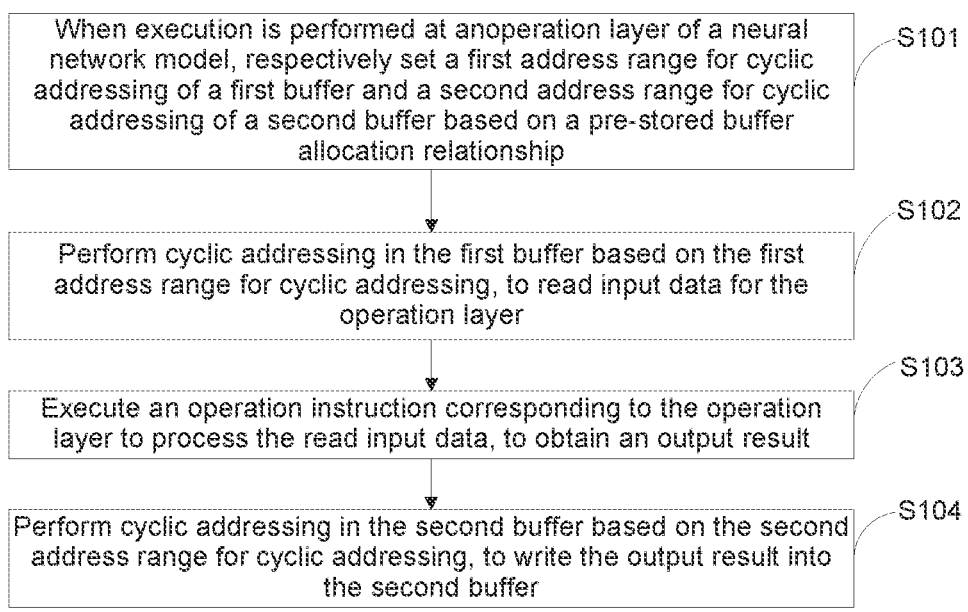
FIG. 2 is a schematic flowchart of a data processing method according to an exemplary embodiment of this application.

FIG. 2 is a schematic flowchart of a data processing method according to an exemplary embodiment of this application. As shown in FIG. 2, the following steps are included.

Step S101. When execution is performed at an operation layer of a neural network model, respectively set a first address range for cyclic addressing of a first buffer and a second address range for cyclic addressing of a second buffer based on a pre-stored buffer allocation relationship.

In this embodiment, the foregoing neural network model includes a plurality of operation layers, and the operation layer at which execution is performed in step S101 may be any one of the plurality of operation layers. In an optional embodiment, for each operation layer of the neural network model, a data processing process for the operation layer may be implemented through the data processing method provided in this embodiment of this application.

For example, the neural network model may be a convolutional neural network model. The operation layer may be a convolutional layer, a pooling layer, a scaling-up/down layer, or a concat layer. Certainly, the foregoing neural network model may also be another type of neural network model, for example, a deep neural network model or a cyclic neural network model.

In this embodiment, the buffer allocation relationship may include a correspondence of feature data of the operation layer to a corresponding buffer and a corresponding cyclic addressing range in the buffer. The feature data of the operation layer includes input data and an output result. The first buffer is a buffer corresponding to the input data for the operation layer, and the second buffer is a buffer corresponding to the output result of the operation layer. It should be noted that the first buffer and the second buffer may be a same buffer, or may be different buffers; this may be set according to requirements of an actual application scenario.

For example, if feature data of a certain operation layer includes input data INPUT and an output result OUT, the buffer allocation relationship includes a correspondence of the input data INPUT to a corresponding buffer and a corresponding cyclic addressing range in this buffer, and a correspondence of the output result OUT to a corresponding buffer and a corresponding cyclic addressing range in this buffer.

In addition, it may be understood that when the data processing method provided in this embodiment needs to be performed on each of the operation layers of the neural network model, the buffer allocation relationship may include buffers corresponding to the feature data of each of the operation layers of the neural network model and corresponding cyclic addressing ranges in the buffers.

For example, a convolutional neural network model includes three convolutional layers, where input data (Feature) stored in a DDR (Double Data Rate) memory first enters a first convolutional layer (CONV1) for convolution calculation, and an output result OUT1 of the first convolutional layer enters a second convolutional layer (CONV2). An output result OUT2 of the second convolutional layer enters a third convolutional layer, the output result OUT1 of the first convolutional layer enters the third convolutional layer to serve as a bias, and a result OUT3 of the third convolutional layer is output to the DDR. In this case, the buffer allocation relationship may include buffers respectively corresponding to the Feature, the output result OUT1, the output result OUT2, and the output result OUT3, and cyclic addressing ranges respectively corresponding to the Feature, the output result OUT1, the output result OUT2, and the output result OUT3 in the corresponding buffers.

During specific implementations, according to requirements of an actual application scenario, a user may flexibly configure and pre-store a buffer allocation relationship corresponding to the neural network model, so that when the feature data involved in the neural network model needs to be read or written from or into the buffer by means of cyclic addressing, an address range for cyclic addressing of the corresponding buffer can be updated based on the buffer allocation relationship.

Step S102. Perform cyclic addressing in the first buffer based on the first address range for cyclic addressing, to read input data for the operation layer.

For example, a first buffer corresponding to input data for an operation layer of the neural network model is a buffer BUFFER0, and a cyclic addressing range is [START0, END0) in the buffer BUFFER0. After step S101 is performed for the operation layer, a first cyclic addressing range of the first buffer may be set as [START0, END0). Further, cyclic addressing may be performed within the [START0, END0) of the buffer BUFFER0, and a corresponding data reading instruction may be executed, to read a designated amount of data starting from a start address of current to-be-read data as the input data for this operation. During this process, when the address END0 is accessed, if reading of the current to-be-read data is not yet completed, reading is continued through skipping to the address START0, until reading of the current to-be-read data is completed.

It may be understood that the input data read in step S102 needs to be written into a corresponding buffer address in advance. If the input data required by the operation layer at which execution is performed is external input data in step S101, a cyclic addressing range in the first buffer corresponding to the input data needs to be preset as a second address range for cyclic addressing of the first buffer. Subsequently, a corresponding data writing instruction is executed, cyclic addressing is performed in the first buffer based on the second address range for cyclic addressing, and the input data required for this operation is written into a corresponding address space in the first buffer from an external memory, such as a DDR. If the input data required by the operation layer at which execution is performed in step S101 is intermediate-result data, i.e., an output result of a previous operation layer, the output result may be written into the corresponding address space in the first buffer based on a corresponding address range for cyclic addressing once the output result of the previous operation layer is obtained.

Step S103. Execute an operation instruction corresponding to the operation layer to process the read input data, to obtain an output result.

The operation instruction corresponding to the operation layer is used to execute an operating process of the operation layer. For example, if the operation layer is a convolutional layer, the operation instruction is designed for performing convolution processing on the read input data. For details, reference may be made to a prior operation instruction, which is not described herein.

Step S104. Perform cyclic addressing in the second buffer based on the second address range for cyclic addressing, to write the output result into the second buffer.

Because the second address range for cyclic addressing of the second buffer corresponding to the output result is already set in step S101, after the output result of the operation layer is obtained, the corresponding data writing instruction may be executed, and cyclic addressing may be performed in the second buffer based on the second address range for cyclic addressing, to complete writing of the output result. It may be understood that the specific data writing process is similar to the data reading process, and details are not described herein again.

To understand the data processing process provided in this embodiment more clearly, a buffer structure and a neural network model as exemplary examples are described below.

Figure 3:
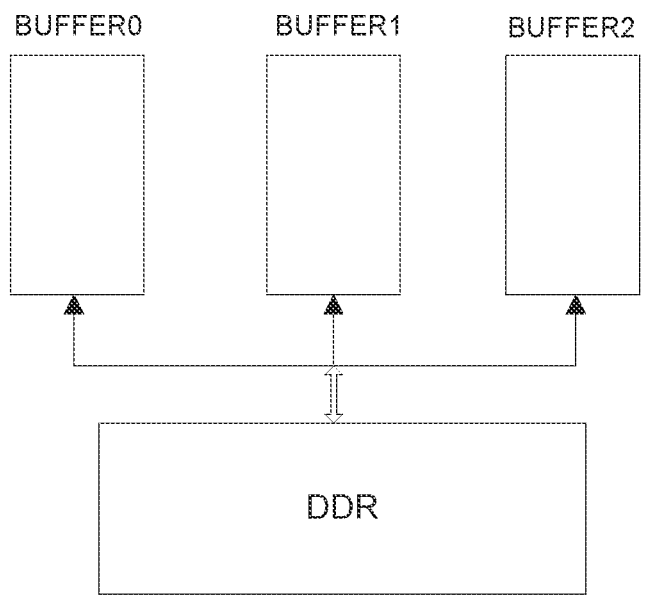
FIG. 3 is a schematic structural diagram of a buffer structure according to an exemplary embodiment of this application.

FIG. 3 shows a schematic structural diagram of an exemplary buffer structure. As shown in FIG. 3, there are three buffers BUFFER0, BUFFER1 and BUFFER2 in the buffer structure in total. Each of the buffers may exchange data with the others of the buffers, and may exchange data with the DDR memory.

Figure 4:
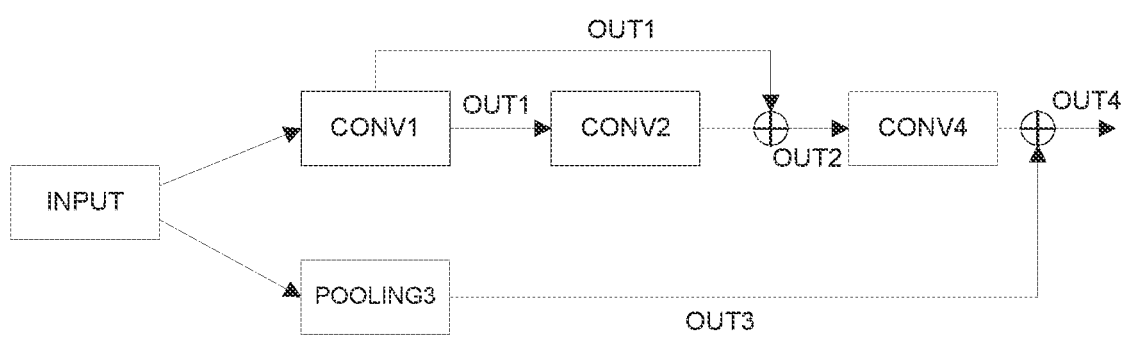
FIG. 4 is a schematic structural diagram of a neural network model according to an exemplary embodiment of this application.

FIG. 4 shows a schematic structural diagram of an exemplary neural network model. As shown in FIG. 4, the neural network model includes a first convolutional layer CONV1, a second convolutional layer CONV2, a pooling layer POOLING3, and a third convolutional layer CONV4. Input for the model is input data INPUT for the first convolutional layer CONV1 and the pooling layer POOLING3. Element-wise addition may be performed on an output result of the second convolutional layer CONV2 and an output result OUT1 of the first convolutional layer CONV1, to obtain an output result OUT2; and element-wise addition may be performed on an output result OUT3 of the pooling layer POOLING3 and an output result of the third convolutional layer CONV4, to obtain an output result OUT4, to serve as output of the entire model.

Figure 5:
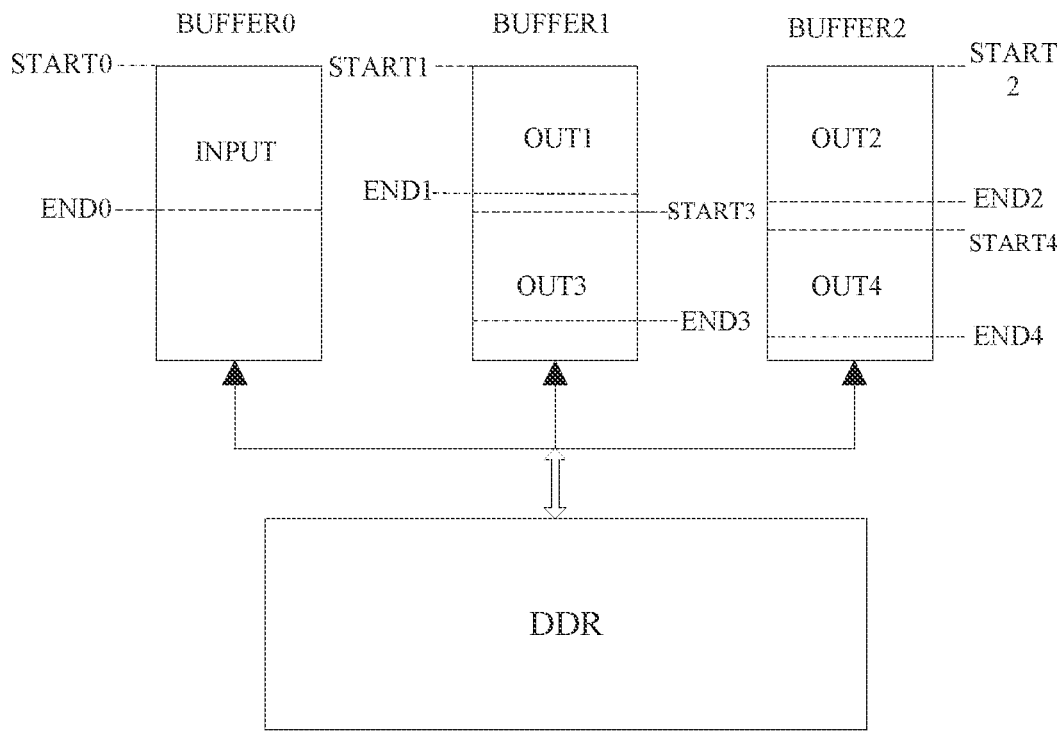
FIG. 5 is a schematic diagram of buffer allocation according to an exemplary embodiment of this application.

As shown in FIG. 5, assuming that in the pre-stored buffer allocation relationship, if a buffer corresponding to the input data INPUT is the buffer BUFFER0, a corresponding cyclic addressing range in the buffer BUFFER0 is [START0, END0); if a buffer corresponding to the output result OUT1 is a buffer BUFFER1, a corresponding cyclic addressing range in the buffer BUFFER1 is [START1, END1); if a buffer corresponding to the output result OUT2 is BUFFER2, a corresponding cyclic addressing range in the buffer BUFFER2 is [START2, END2); if a buffer corresponding to the output result OUT3 is the buffer BUFFER1, a corresponding cyclic addressing range in the buffer BUFFER1 is [START3, END3); and if a buffer corresponding to the output result OUT4 is the buffer BUFFER2, a corresponding cyclic addressing range in the buffer BUFFER2 is [START4, END4).

On this basis, during the operating process of the neural network model shown in FIG. 4, when execution is performed at the first convolutional layer CONV1, a first address range for cyclic addressing of the buffer BUFFER0 is set to [START0, END0), and a second address range for cyclic addressing of the buffer BUFFER1 is set to [START1, END1). Subsequently, a data reading instruction corresponding to the first convolutional layer CONV1 may be executed, and cyclic addressing may be performed in the buffer BUFFER0 based on [START0, END0) to read the pre-stored input data INPUT. After the output result OUT1 is obtained by performing operation at the first convolutional layer CONV1, a corresponding data writing instruction is executed, and cyclic addressing is performed in the buffer BUFFER1 based on [START1, END1), to write the output result OUT1 into the buffer BUFFER1. When execution is performed at the second convolutional layer CONV2, a first address range for cyclic addressing of the buffer BUFFER1 is set to [START1, END1), and a second address range for cyclic addressing of the buffer BUFFER2 is set to [START2, END2). Subsequently, a data reading instruction corresponding to the second convolutional layer CONV2 may be executed, and cyclic addressing may be performed in the buffer BUFFER1 based on [START1, END1) to read the output result OUT1. After the output result OUT2 is obtained by performing operation at the second convolutional layer CONV2 and performing element-wise addition, a data writing instruction corresponding to the second convolutional layer CONV2 is executed, and cyclic addressing is performed in the buffer BUFFER2 based on [START2, END2), to write the output result OUT2 into the buffer BUFFER2. Other operation layers may be deduced by analogy, and details are not described herein again.

According to the data processing method provided in this embodiment, the user may configure, in the buffer allocation relationship, the buffer corresponding to each feature data and the cyclic addressing range in the buffer according to requirements of an actual application scenario, so as to flexibly set a cyclic addressing range for reading of a corresponding buffer and a cyclic addressing range for writing of a corresponding buffer. For example, a plurality of different feature data may be allocated to a same buffer, and corresponding cyclic addressing ranges of these feature data in the buffer may be set to not overlap with each other, so that a plurality of different feature data, such as, input data and an output result of a same operation layer or input data and output results of different operation layers, share a same buffer. In this way, utilization efficiency of the buffer can be effectively improved and operation efficiency for the model can be further improved, without concern about data overwriting being caused by different sizes or growth rates of the feature data.

On the basis of the foregoing embodiment shown in FIG. 2, when a plurality of different feature data involved in the neural network model are allocated to a same buffer, the cyclic addressing ranges corresponding to the foregoing a plurality of different feature data in the buffer do not overlap with each other. For example, in the buffer allocation relationship, the input data for and the output result of a certain operation layer may be allocated to a same buffer, and a cyclic addressing range corresponding to the input data in the buffer and a cyclic addressing range corresponding to the output result in the buffer are set to not overlap with each other. Because the cyclic addressing ranges respectively corresponding to the input data and the output result do not overlap with each other, although the input data and the output result share a same buffer, one the data may not be overwritten with the other data, and there is no need to concern too much about interleaving of reading and/or writing stages of these data during parallel processing. This is helpful to reduce limitations in a data-buffer allocation process, thereby improving buffer allocation efficiency.

In an optional embodiment, each buffer can store at most two types feature data, which is set according to an actual size of stored data and storage capacity of the buffer. Certainly, in other embodiments of this application, three or more types of feature data may also be stored, which is not limited herein.

On the basis of the foregoing embodiment shown in FIG. 2, the foregoing data processing method further includes a buffer allocation step. The buffer allocation step includes: allocating a buffer for each feature data based on a size of each feature data of the operation layer, and determining a cyclic addressing range corresponding to each feature data in the corresponding buffer; and determining a correspondence relationship among each feature data, the corresponding buffer and the corresponding cyclic addressing range as the buffer allocation relationship corresponding to the operation layer. It may be understood that the buffer allocation and the cyclic addressing range corresponding to each feature data in the corresponding buffer may be flexibly set according to actual requirements. Utilization efficiency of the buffer may be fully considered while the buffer allocation relationship is configured. For example, by allocating a same buffer for a plurality of different feature data and setting the corresponding cyclic addressing ranges to not overlap with each other, utilization efficiency of the buffer is improved while reliability of an operation result of the model is ensured, thereby further improving operation efficiency for the model.

In this embodiment, there may be a plurality of buffer allocation manners. For example, allocation may be performed based on an actual quantity of buffers, a quantity of feature data, and a size of the feature data. A specific allocation manner is not limited.

In an optional implementation, to improve space utilization of the buffer, the feature data of various layers of the neural network model may be allocated by group according to actual requirements. In other words, a same buffer is allocated for a plurality of different feature data. For example, a same buffer may be allocated for the input data for and the output result of a same operation layer, and a same buffer may be allocated for the input data for an operation layer and the output result of another operation layer different from the former.

In an optional implementation, if a same operation layer includes a plurality of different input data, these different input data may be respectively allocated to different buffers. In this way, parallel reading of these different input data may be achieved without increasing data reading ports of the buffer, thereby helping to increase a data reading speed and further an operating speed of the neural network model. Similarly, if a same operation layer includes a plurality different output results, and these output results are applicable to different objects, for example, these output results respectively serve as inputs for different subsequent operation layers, these different output results may be respectively allocated to different buffers.

In an optional implementation, considering that input data for a first layer of the neural network model is usually significantly larger than input data for and output data of an intermediate layer, an individual buffer may be allocated for the input data for the first layer. In this way, an amount of input data that can be stored for each operation can be improved, thereby helping to accelerate the operating speed of the model.

Specifically, a process of determining the cyclic addressing range corresponding to each feature data in the corresponding buffer may include: for each feature data, determining a start address for the feature data in the corresponding buffer, and determining a target data block obtained by splitting the feature data; and based on the start address for the feature data and a size of the target data block, determining the cyclic addressing range corresponding to the feature data in the corresponding buffer. It may be understood that the start address for the feature data needs to be within the cyclic addressing range corresponding to the feature data, which facilitate the determining of a cyclic addressing range that is more suitable for the feature data, thereby helping to further improve utilization efficiency of the buffer.

In an actual application scenario, after a buffer is allocated for each feature data as required, setting of the start address for the feature data in the buffer may be performed, and then writing or reading of feature data may be performed from the start address.

Due to limitations by costs and other aspects, the capacity of the buffer is usually limited. For example, when input data for the neural network model is relatively large, the data may not be fully buffered. As a result, there may be still a large amount of data transport, and execution efficiency of each operation in the neural network model is affected. In view of the above, in the technical solutions of the embodiments of this application, the input data for a designated operation layer (for example, an input layer or a certain intermediate layer) in the neural network model may be "split" into a plurality of data blocks. Subsequently, In place of the original input data, each of the plurality of the obtained data blocks may be provided as input data to the designated layer.

The foregoing "splitting" needs to at least make sure that a final output result of the neural network model is not changed. In other words, when each obtained data block is provided as input data to the foregoing designated operation layer, a result obtained by combining (for example, "splicing" or "lapping") a plurality of output sub-data obtained through successive operations at a plurality of layers needs to be the same as an output result obtained through the foregoing successive operations at the plurality of layers by directly providing original input data before the "splitting" as input to the designated operation layer.

It should be noted that there may be a plurality of specific "splitting" manners. In an optional implementation, some data blocks obtained through splitting partially overlap with each other. In another implementation, any two data blocks obtained through splitting do not overlap with each other. Specifically, splitting may be performed according to requirements of an actual application scenario, which is not limited herein.

After the feature data is split into a plurality of data blocks, a target data block may be determined therefrom, and then a cyclic addressing depth H corresponding to the feature data may be determined based on the target data block. Subsequently, a cyclic addressing range with a depth H containing the start address for the feature data is determined as the cyclic addressing range corresponding to the feature data in the buffer. It should be noted that the cyclic addressing depth H needs to be less than or equal to an available depth of the buffer. The available depth refers to a depth of an address range that is not "occupied" in the buffer. For example, before the cyclic addressing range corresponding to the feature data in the buffer is determined, if a certain address range in the buffer has been determined as a cyclic addressing range corresponding to another feature data involved in the model, it is indicated that the address range has been "occupied".

In an implementation, the target data block may be a data block with the largest amount of data among the plurality of data blocks obtained through splitting. For example, if a size of the feature data is 1 MB, and the feature data may be split into three data blocks respectively with sizes of 300 KB, 300 KB, and 400 KB, the data block with the size of 400 KB may be determined as the target data block. In this case, a depth h of an address range for occupation by the target data block in the buffer may be determined as the cyclic addressing depth corresponding to the feature data. Alternatively, the cyclic addressing depth corresponding to the feature data may be set to be greater than the depth h of the address range for occupation by the target data block in the buffer. For example, it is set that H=nh, where n is an integer greater than 1, and H and h both are positive integers. In this case, it may be ensured that it may not occur that the feature data is self-overwritten in the buffer, so as to ensure rationality of setting of the cyclic addressing range.

Certainly, in other embodiments of this application, any data block may be selected as the target data block. Further, the cyclic addressing depth corresponding to the feature data is set to m times of the depth of the address range for occupation by the target data block in the buffer, where m is an integer greater than or equal to 2.

After the buffer is allocated for each feature data and the cyclic addressing range of each feature data in the corresponding buffer is determined, a correspondence relationship among the feature data, the buffer and the cyclic addressing range may be determined as the buffer allocation relationship corresponding to the operation layer. Similarly, buffers corresponding to each of all feature data involved in the neural network model and the cyclic addressing ranges in the corresponding buffers may be determined, that is, a buffer allocation relationship corresponding to entire neural network model may be constructed.

On the basis of the foregoing embodiment shown in FIG. 2, each buffer is correspondingly provided with a first storage space and a second storage space. The first storage space is used to store an address range for cyclic addressing for reading of a corresponding buffer, and the second storage space is used to store an address range for cyclic addressing for writing of a corresponding buffer. In step S101, the process of setting the first address range for cyclic addressing corresponding to the first buffer and the second address range for cyclic addressing corresponding to the second buffer based on the pre-stored buffer allocation relationship may include: storing a cyclic addressing range, in the buffer allocation relationship, corresponding to the input data for the operation layer into the first storage space, to serve as a first address range for cyclic addressing of the first buffer; and storing a cyclic addressing range, in the buffer allocation relationship, corresponding to the output result of the operation layer into the second storage space, to serve as a second address range for cyclic addressing of the second buffer.

During reading the input data, cyclic addressing may be performed in the first buffer based on the cyclic addressing range stored in the first storage space. When an end address of the cyclic addressing range is accessed, reading is continued through skipping to a start address of the cyclic addressing range. During writing the output result, cyclic addressing may be performed in the second buffer based on the cyclic addressing range stored in the second storage space. When an end address of the cyclic addressing range is accessed, writing is continued through skipping to a start address of the cyclic addressing range.

In an application scenario, a memory device may be correspondingly provided for each buffer. The memory device corresponding to each buffer includes two groups of storage spaces, where one group of storage spaces are used to store an address range for cyclic addressing for reading of a corresponding buffer, and the other group of storage spaces are used to store an address range for cyclic addressing for writing of a corresponding buffer. For example, each memory device may include two groups of registers, which respectively correspond to setting of address for cyclic addressing for reading of a buffer and writing of a buffer. Specifically, each group of registers includes two registers, which are respectively configured to set a start address START and an end address END for the cyclic addressing, that is, an address space within a range of [START, END) is a range of the cyclic addressing. When the end address is accessed, a skip to the start address may be automatically performed.

Figure 6:
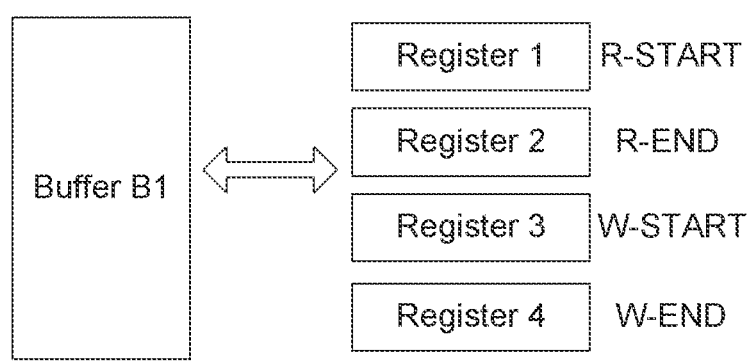
FIG. 6 is a schematic diagram of a manner of setting a memory device according to an exemplary embodiment of this application.

For example, as shown in FIG. 6, a buffer B1 is correspondingly provided with a register 1, a register 2, a register 3, and a register 4. The register 1 and the register 2 are respectively configured to set a start address R-START and an end address R-END for cyclic addressing for reading of the buffer B1. The register 3 and the register 4 are respectively configured to set a start address W-START and an end address W-END for cyclic addressing for writing of the buffer B1. After R-START and R-END are respectively set by the register 1 and the register 2, an accessing address may be compared with the address R-END set by the register 2 when reading data from the buffer B1. If the accessing address is consistent with R-END, a skip to the address R-START set by the register 1 is performed, and reading is continued from R-START. According to this embodiment, additionally providing a dedicated storage space for setting of the cyclic addressing range of the buffer is simple and convenient, and thus errors are not easily caused. In this way, reliability of a data reading and writing process is ensured, and the buffer space may not be occupied, thereby helping to improve the utilization efficiency of buffer.

Certainly, in other application scenarios, part of the storage space in each buffer may also be dedicated for setting of a start address and an end address for cyclic addressing for reading of the buffer and a start address and an end address for cyclic addressing for writing of the buffer.

Exemplary Apparatus

Figure 7:
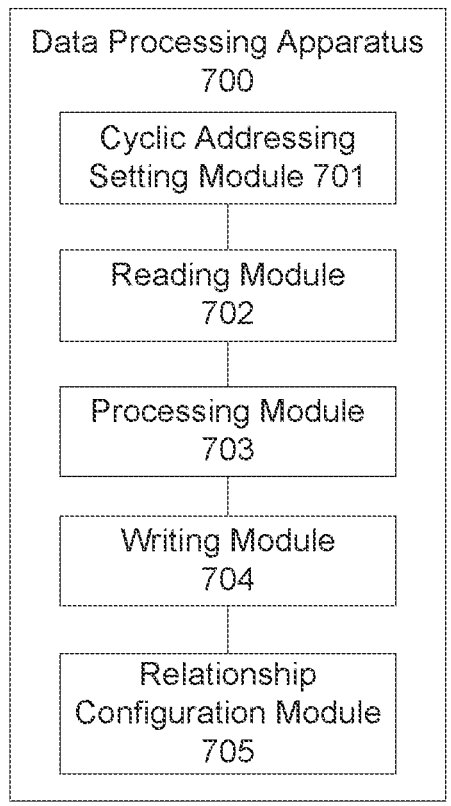
FIG. 7 is a block diagram of a data processing apparatus according to an exemplary embodiment of this application.

FIG. 7 is a block diagram of a data processing apparatus according to an exemplary embodiment of this application.

As shown in FIG. 7, an embodiment of this application provides a data processing apparatus. The data processing apparatus 700 may include:

a cyclic addressing setting module 701, configured to set, when execution is performed at an operation layer of a neural network model, a first address range for cyclic addressing of a first buffer and a second address range for cyclic addressing of a second buffer based on a pre-stored buffer allocation relationship, where the first buffer is a buffer corresponding to input data for the operation layer, the second buffer is a buffer corresponding to an output result of the operation layer, the buffer allocation relationship includes a correspondence of feature data of the operation layer to a corresponding buffer and a corresponding cyclic addressing range in the buffer, where the feature data includes the input data and the output result;

a reading module 702, configured to perform cyclic addressing in the first buffer based on the first address range for cyclic addressing, to read the input data for the operation layer;

a processing module 703, configured to execute an operation instruction corresponding to the operation layer to process the read input data, to obtain an output result; and a writing module 704, configured to perform cyclic addressing in the second buffer based on the second address range for cyclic addressing.

In an optional embodiment, when a plurality of different feature data correspond to a same buffer, cyclic addressing ranges corresponding to the plurality of different feature data in the buffer do not overlap with each other.

Figure 8:
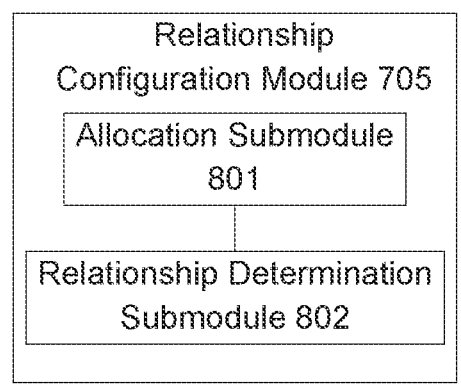
FIG. 8 is a block diagram of a relationship configuration module according to an exemplary embodiment of this application.

In an optional embodiment, the foregoing data processing apparatus 700 further includes a relationship configuration module 705. As shown in FIG. 8, the relationship configuration module 705 includes: an allocation submodule 801, configured to allocate a buffer for each feature data based on a size of each feature data of the operation layer, and determine a cyclic addressing range corresponding to each feature data in the corresponding buffer; and a relationship determination submodule 802, configured to determine a corresponding relationship among each feature data, the corresponding buffer and the corresponding cyclic addressing range as a buffer allocation relationship corresponding to the operation layer.

In an optional embodiment, the foregoing allocation submodule 801 is configured to: for each feature data, determine a start address for the feature data in the corresponding buffer, and determine a target data block obtained by splitting the feature data; and based on the start address for the feature data and a size of the target data block, determine the cyclic addressing range corresponding to the feature data in the corresponding buffer.

In an optional embodiment, the target data block is a largest data block among a plurality of data blocks obtained by splitting the feature data.

In an optional embodiment, the foregoing cyclic addressing setting module 701 is configured to: store a cyclic addressing range, in the buffer allocation relationship, corresponding to the input data for the operation layer into a first storage space, to serve as the first address range for cyclic addressing of the first buffer; and store a cyclic addressing range corresponding to the output result of the operation layer into a second storage space, to serve as the second address range for cyclic addressing of the second buffer. The first storage space is used to store an address range for cyclic addressing for reading of the first buffer, and the second storage space is used to store an address range for cyclic addressing for writing of the second buffer.

It should be noted that the foregoing various modules may be implemented by software code, or may be implemented by hardware such as a logic gate circuit or an integrated circuit chip, or may also be implemented in a form of a combination of hardware and software.

Herein, a person skilled in the art may understand that specific functions and operations of modules in the foregoing data processing apparatus 700 have been described in detail in the description of the data processing method in the foregoing method embodiments. Therefore, repeated description may be omitted herein.

Exemplary Processor

Figure 9:
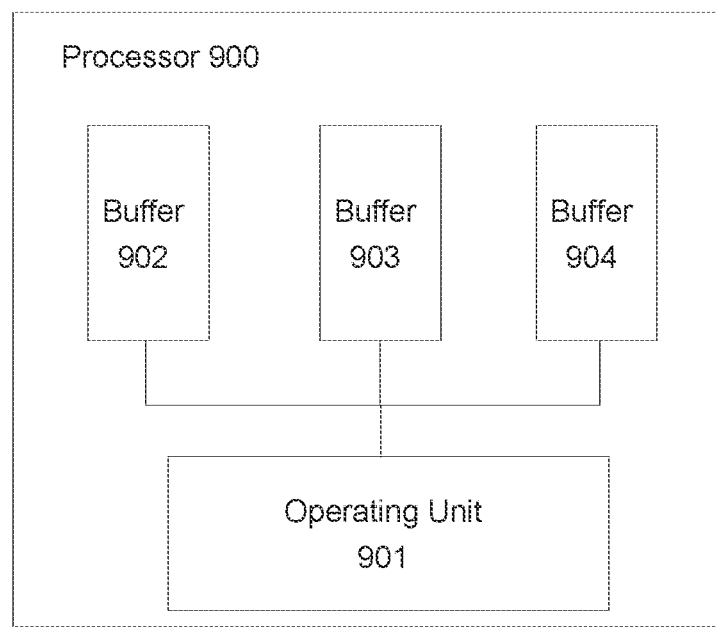
FIG. 9 is a schematic structural diagram of a processor according to an exemplary embodiment of this application.

FIG. 9 is a block diagram of a processor according to an exemplary embodiment of this application.

As shown in FIG. 9, a processor 900 includes an operating unit 901 and one or more buffers (for example, a buffer 902, a buffer 903, and a buffer 904 shown in FIG. 9). Moreover, the one or more buffers are all connected to the operating unit 901, and the operating unit 901 is configured to implement the data processing method provided in the foregoing exemplary method embodiments. The specific implementation process and generated technical effects have been described in detail in the description of the foregoing method embodiments, and details are not repeated herein.

Figure 10:
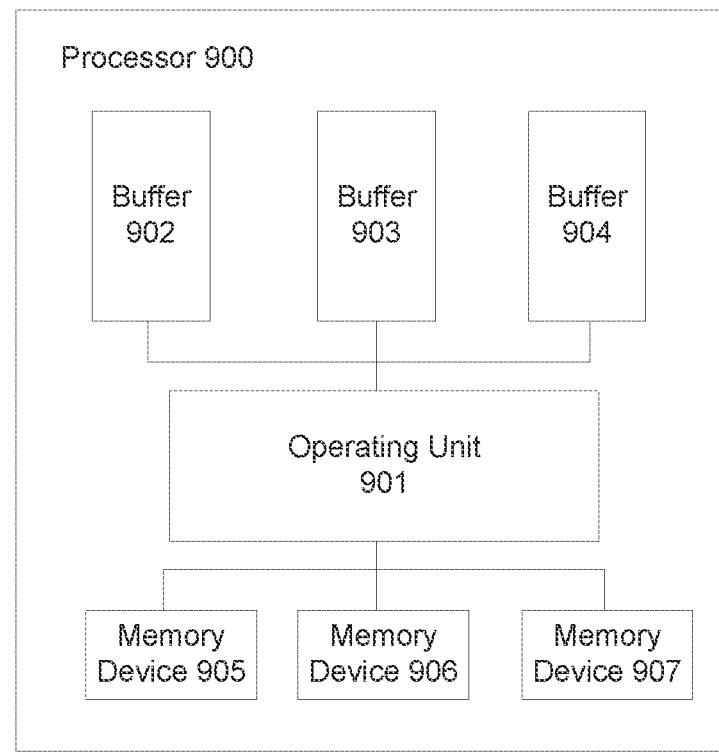
FIG. 10 is a schematic structural diagram of a processor according to another exemplary embodiment of this application.

As shown in FIG. 10, in an optional embodiment, the processor 900 further includes memory devices (for example, a memory device 905, a memory device 906, and a memory device 907 shown in FIG. 10) that are provided respectively corresponding to each buffer. Each of the memory devices 905 to 907 corresponding to each buffer is connected to the operating unit 901. Each of memory devices 905 to 907 includes two groups of storage spaces, where one group of storage spaces are used to store an address range for cyclic addressing for reading of a corresponding buffer, and the other group of storage spaces are used to store an address range for cyclic addressing for writing of a corresponding buffer. In this way, by setting the memory devices 905 to 907, the address range for cyclic addressing for reading of a corresponding buffer and the address range for cyclic addressing for writing of each buffer may be flexibly set. It should be noted that the quantity of buffers and the quantity of corresponding memory devices shown in FIG. 10 are merely for illustration and not for limitation. It should also be noted that these memory devices may be integrated as an integral, or may be separately disposed.

Figure 11:
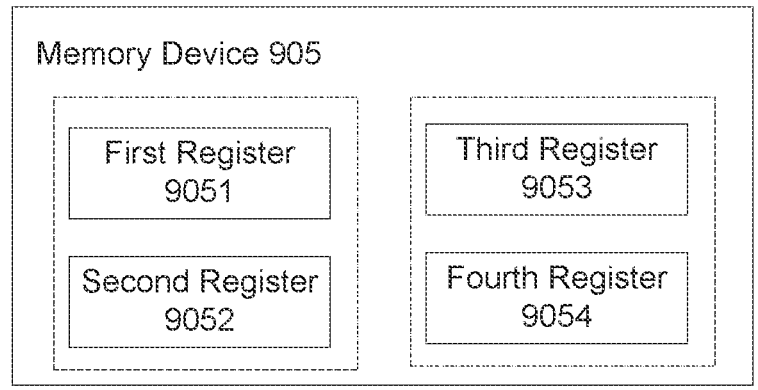
FIG. 11 is a schematic structural diagram of a memory device according to an exemplary embodiment of this application.

In an implementation, the memory device may include two groups of registers, which respectively correspond to setting of address for cyclic addressing for reading of a buffer and writing of a buffer. Specifically, each group of registers includes two registers, which are respectively configured to set a start address START and an end address END for the cyclic addressing, that is, an address space within a range of [START, END) is a range of the cyclic addressing. When the end address is accessed, a skip to the start address may be automatically performed. As shown in FIG. 11, using the memory device 905 shown in FIG. 10 as an example, the memory device 905 includes a first group of registers and a second group of registers, where the first group of registers includes a first register 9051 and a second register 9052, and the second group of registers includes a third register 9053 and a fourth register 9054. The first register 9051, the second register 9052, the third register 9053, and the fourth register 9054 are all connected to the operating unit 901.

For example, the processor 900 provided in this embodiment may be a BCU (Branch Processing Unit) or another applicable processor, and may be used as an AI processor applicable to automatic driving, image recognition, video analysis, natural language processing, and other fields.

Exemplary Electronic Device

Figure 12:
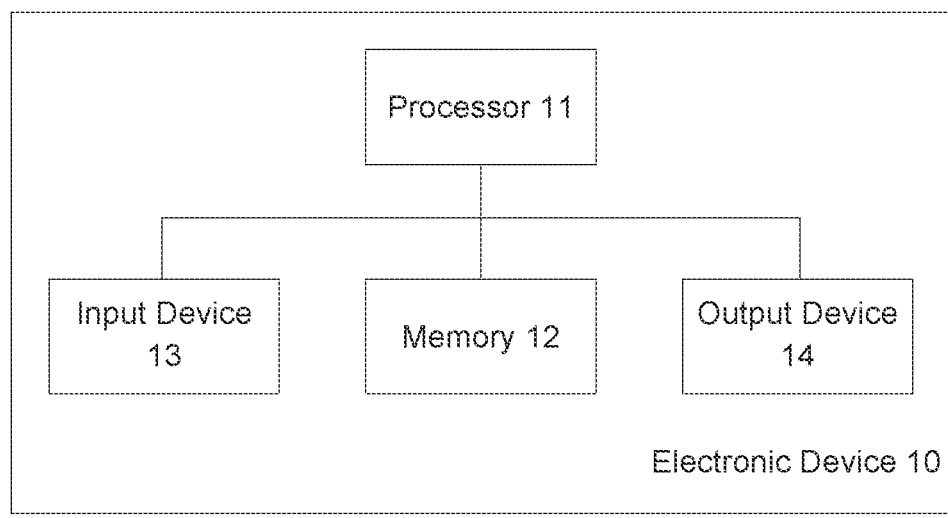
FIG. 12 is a structural diagram of an electronic device according to another exemplary embodiment of this application.

FIG. 12 is a block diagram of an electronic device according to an embodiment of this application.

As shown in FIG. 12, an electronic device 10 includes one or more processors 11 and a memory 12.

The processor 11 may be a central processing unit (CPU) or another form of processing unit, such as BCU, having a data processing capability and/or an instruction execution capability, and may control another component in the electronic device 10 to perform a desired function. The processor includes an operating unit and one or more buffers. The specific structure has been described in detail in the foregoing exemplary processor, and details are not repeated herein.

The memory 12 may include one or more computer program products. The computer program product may include various forms of computer readable storage media, such as a volatile memory and/or a non-volatile memory. The volatile memory may include, for example, a random access memory (RAM), a cache and/or the like. The non-volatile memory may include, for example, a read-only memory (ROM), a hard disk, a flash memory and the like. One or more computer program instructions may be stored on the computer readable storage medium. The program instruction may be executed by the processor 11, to implement the data processing method according to the foregoing method embodiments described above and/or other desired functions. Various contents such as an input signal, a signal component, and a noise component may also be stored on the computer readable storage medium.

In an example, the electronic device 10 may further include an input device 13 and an output device 14. These components are interconnected with each other through a bus system and/or another form of connection mechanism (not shown).

When the electronic device is a computer device, the input device 13 may be a communication network connector for receiving network data. In addition, the input device 13 may further include, for example, a keyboard, a mouse and so on. The output device 14 may include, for example, a display, a loudspeaker, a printer, a communication network, a remote output device connected by the communication network, and so on.

Certainly, for simplicity, FIG. 12 shows only some of components in the electronic device 10 that are related to this application, and components such as a bus and an input/output interface are omitted. In addition, according to specific application situations, the electronic device 10 may further include any other appropriate components.

Exemplary Computer Program Product and Computer-Readable Storage Medium

In addition to the foregoing method and device, the embodiments of this application may further relate to a computer program product, which includes a computer program instruction. When executing the computer program instruction, the processor is enabled to perform the steps, of the data processing method according to the embodiments of this application, that are described in the "exemplary method" part of this specification.

The computer program product may be program code, written with one or any combination of a plurality of programming languages, that is configured to perform the operations in the embodiments of this application. The programming languages include an object-oriented programming language such as Java or C++, and further include a conventional procedural programming language such as a "C" language or a similar programming language. The program code may be entirely or partially executed on a user computing device, executed as an independent software package, partially executed on the user computing device and partially executed on a remote computing device, or entirely executed on the remote computing device or a server.

In addition, the embodiments of this application may further relate to a computer-readable storage medium, which stores a computer program instruction. When executing the computer program instruction, the processor is enabled to perform the steps, of the data processing method according to the embodiments of this application, that are described in the "exemplary method" part of this specification.

The computer-readable storage medium may be one readable medium or any combination of a plurality of readable media. The readable medium may be a readable signal medium or a readable storage medium. The readable storage medium may include, for example, but is not limited to electricity, magnetism, light, electromagnetism, infrared ray, or a semiconductor system, apparatus or device, or any combination of the above. More specific examples (a non-exhaustive list) of the readable storage medium include: an electrical connection with one or more conducting wires, a portable disk, a hard disk, a random access memory (RAM), a read-only memory (ROM), an erasable programmable read-only memory (EPROM or flash memory) or a flash memory, an optical fiber, a portable compact disk read-only memory (CD-ROM), an optical storage device, a magnetic storage device, or any suitable combination of the above.

Basic principles of this application are described above in combination with the specific embodiments. However, it should be pointed out that the advantages, superiorities, and effects mentioned in this application are merely illustrative but are not for limitation, and it cannot be considered that these advantages, superiorities, and effects are necessary for each embodiment of this application. In addition, specific details of the above disclosure are merely for examples and for ease of understanding, rather than limitations. The foregoing details do not limit that this application must be implemented by using the foregoing specific details.

The block diagrams of the equipment, the apparatus, the device, and the system involved in this application are merely exemplary examples and are not intended to require or imply that the equipment, the apparatus, the device, and the system must be connected, arranged, and configured in the manners shown in the block diagrams. It is recognized by a person skilled in the art that, the equipment, the apparatus, the device, and the system may be connected, arranged, and configured in an arbitrary manner. The terms such as "include", "contain", and "have" are open terms that mean "including but not limited to", and may be used interchangeably with "including but not limited to". The terms "or" and "and" used herein refer to the term "and/or", and may be used interchangeably with "and/or", unless the context clearly indicates otherwise. The term "such as" used herein refers to the phrase "such as but not limited to", and may be used interchangeably with "such as but not limited to".

It should be further pointed out that, various components or various steps in the apparatus, the device, and the method of this application may be disassembled and/or recombined. These disassembled and/or recombined components or steps shall be regarded as equivalent solutions of this application.

The foregoing description about the disclosed aspects is provided, so that this application can be arrived at or carried out by any person skilled in the art. Various modifications to these aspects are very obvious to a person skilled in the art. Moreover, general principles defined herein may be applicable to other aspects without departing from the scope of this application. Therefore, this application is not intended to be limited to the aspect illustrated herein, but to the widest scope consistent with the principles and novel features disclosed herein.

The foregoing description has been given for illustration and description. In addition, this description is not intended to limit the embodiments of this application to be in forms disclosed herein. Although a plurality of exemplary aspects and embodiments have been discussed above, a person skilled in the art may recognize certain variations, modifications, changes, additions, and sub-combinations thereof.

What is claimed is:

1. A data processing method, including:
   in response to determining that execution is performed at an operation layer of a neural network model, setting a first address range for cyclic addressing of a first buffer and a second address range for cyclic addressing of a second buffer based on a buffer allocation relationship which is pre-stored, wherein the first buffer is a buffer corresponding to input data for the operation layer, the second buffer is a buffer corresponding to an output result of the operation layer, the buffer allocation relationship includes a correspondence of feature data of the operation layer to a corresponding buffer and a corresponding cyclic addressing range in a corresponding buffer, wherein the corresponding buffer is one of the first buffer and the second buffer, wherein the feature data includes the input data and the output result, and the correspondence of feature data of the operation layer to the corresponding buffer and the corresponding cyclic addressing range in the corresponding buffer includes the correspondence of the input data for the operation layer to the first buffer and the first address range for cyclic addressing of the first buffer, and the correspondence of the output result of the operation layer to the second buffer and the second address range for cyclic addressing of the second buffer;

performing cyclic addressing in the first buffer based on the first address range for cyclic addressing, to read the input data for the operation layer;

executing an operation instruction corresponding to the operation layer to process the read input data, to obtain an output result; and performing cyclic addressing in the second buffer based on the second address range for cyclic addressing, to write the output result into the second buffer, wherein the method further includes:

allocating the first buffer and the second buffer for the input data and the output result of each feature data based on a size of each feature data of the operation layer, and determining the corresponding cyclic addressing range corresponding to each feature data in the corresponding buffer; and determining a correspondence relationship among the input data and the output result of each feature data, and determining the corresponding buffer and the corresponding cyclic addressing range as the buffer allocation relationship corresponding to the operation layer, wherein the determining the corresponding cyclic addressing range corresponding to each feature data in the corresponding buffer includes:

for each feature data, determining a start address for the input data and the output result of the feature data in the corresponding buffer, and determining a target data block obtained by splitting the feature data; and determining the corresponding cyclic addressing range corresponding to the feature data in the corresponding buffer based on the start address for the feature data and a size of the target data block.

2. The method according to claim 1, in response to determining that the input data and the output result of a plurality of different feature data correspond to a same buffer, cyclic addressing ranges corresponding to the plurality of different feature data in the same buffer do not overlap with each other.

3. The method according to claim 1, wherein the target data block is a largest data block among a plurality of data blocks obtained by splitting the feature data.

4. The method according to claim 1, wherein the setting a first address range for cyclic addressing of a first buffer and a second address range for cyclic addressing of a second buffer based on a buffer allocation relationship which is pre-stored includes:

storing a cyclic addressing range, in the buffer allocation relationship, corresponding to the input data for the operation layer into a first storage space, to serve as the first address range for cyclic addressing of the first buffer; and storing a cyclic addressing range corresponding to the output result of the operation layer into a second storage space, to serve as the second address range for cyclic addressing of the second buffer, wherein the first storage space is used to store an address range for cyclic addressing for reading of the first buffer, and the second storage space is used to store an address range for cyclic addressing for writing of the second buffer.

5. The method according to claim 1, wherein during reading of the input data, in response to determining an end address of a corresponding first cyclic addressing range for the input data being accessed, reading is continued through skipping to a start address of the corresponding first cyclic addressing range for the input data, until the reading of the input data is completed; and during writing of the output result, when an end address of a corresponding second cyclic addressing range for the output result is accessed, writing is continued through skipping to a start address of the corresponding second cyclic addressing range for the output result.

6. An electronic device, including:

a processor, including an operating unit and one or more buffers; and a memory, in which a computer program instruction is stored, wherein the operating unit, when executing the computer program instruction, is enabled to implement a data processing method, wherein the method includes:

in response to determining that execution is performed at an operation layer of a neural network model, setting a first address range for cyclic addressing of a first buffer and a second address range for cyclic addressing of a second buffer based on a buffer allocation relationship which is pre-stored, wherein the first buffer is a buffer corresponding to input data for the operation layer, the second buffer is a buffer corresponding to an output result of the operation layer, the buffer allocation relationship includes a correspondence of feature data of the operation layer to a corresponding buffer and a corresponding cyclic addressing range in a corresponding buffer, wherein the corresponding buffer is one of the first buffer and the second buffer, wherein the feature data includes the input data and the output result, and the correspondence of feature data of the operation layer to the corresponding buffer and the corresponding cyclic addressing range in the corresponding buffer includes the correspondence of the input data for the operation layer to the first buffer and the first address range for cyclic addressing of the first buffer, and the correspondence of the output result of the operation layer to the second buffer and the second address range for cyclic addressing of the second buffer;

performing cyclic addressing in the first buffer based on the first address range for cyclic addressing, to read the input data for the operation layer;

executing an operation instruction corresponding to the operation layer to process the read input data, to obtain an output result; and performing cyclic addressing in the second buffer based on the second address range for cyclic addressing, to write the output result into the second buffer, wherein the method further includes:

allocating the first buffer and the second buffer for the input data and the output result of each feature data based on a size of each feature data of the operation layer, and determining the corresponding cyclic addressing range corresponding to each feature data in the corresponding buffer; and determining a correspondence relationship among the input data and the output result of each feature data, and determining the corresponding buffer and the corresponding cyclic addressing range as the buffer allocation relationship corresponding to the operation layer, wherein the determining the corresponding cyclic addressing range corresponding to each feature data in the corresponding buffer includes:

for each feature data, determining a start address for the input data and the output result of the feature data in the corresponding buffer, and determining a target data block obtained by splitting the feature data; and determining the corresponding cyclic addressing range corresponding to the feature data in the corresponding buffer based on the start address for the feature data and a size of the target data block.

7. The electronic device according to claim 6, in response to determining that the input data and the output results of a plurality of different feature data correspond to a same buffer, cyclic addressing ranges corresponding to the plurality of different feature data in the same buffer do not overlap with each other.

8. The electronic device according to claim 6, wherein the target data block is a largest data block among a plurality of data blocks obtained by splitting the feature data.

9. The electronic device according to claim 6, wherein the setting a first address range for cyclic addressing of a first buffer and a second address range for cyclic addressing of a second buffer based on a buffer allocation relationship which is pre-stored includes:

storing a cyclic addressing range, in the buffer allocation relationship, corresponding to the input data for the operation layer into a first storage space, to serve as the first address range for cyclic addressing of the first buffer; and storing a cyclic addressing range corresponding to the output result of the operation layer into a second storage space, to serve as the second address range for cyclic addressing of the second buffer, wherein the first storage space is used to store an address range for cyclic addressing for reading of the first buffer, and the second storage space is used to store an address range for cyclic addressing for writing of the second buffer.

10. The electronic device according to claim 6, wherein the processor further includes memory devices that are provided respectively corresponding to each of the buffers, wherein each of the memory devices corresponding to the each of the buffers is connected to the operating unit, and includes two groups of storage spaces, wherein one group of storage spaces are used to store an address range for cyclic addressing for reading of a corresponding buffer, and the other group of storage spaces are used to store an address range for cyclic addressing for writing of a corresponding buffer.

11. A non-transitory computer-readable storage medium, wherein the storage medium stores a computer program, and the computer program is used to implement a data processing method, wherein the method includes:

in response to determining that execution is performed at an operation layer of a neural network model, setting a first address range for cyclic addressing of a first buffer and a second address range for cyclic addressing of a second buffer based on a buffer allocation relationship which is pre-stored, wherein the first buffer is a buffer corresponding to input data for the operation layer, the second buffer is a buffer corresponding to an output result of the operation layer, the buffer allocation relationship includes a correspondence of feature data of the operation layer to a corresponding buffer and a corresponding cyclic addressing range in a corresponding buffer, wherein the corresponding buffer is one of the first buffer and the second buffer, wherein the feature data includes the input data and the output result, and the correspondence of feature data of the operation layer to the corresponding buffer, and the corresponding cyclic addressing range in the corresponding buffer includes the correspondence of the input data for the operation layer to the first buffer and the first address range for cyclic addressing of the first buffer, and the correspondence of the output result of the operation layer to the second buffer and the second address range for cyclic addressing of the second buffer;

performing cyclic addressing in the first buffer based on the first address range for cyclic addressing, to read the input data for the operation layer;

executing an operation instruction corresponding to the operation layer to process the read input data, to obtain an output result; and performing cyclic addressing in the second buffer based on the second address range for cyclic addressing, to write the output result into the second buffer, wherein the method further includes:

allocating the first buffer and the second buffer for the input data and the output result of each feature data based on a size of each feature data of the operation layer, and determining the corresponding cyclic addressing range corresponding to each feature data in the corresponding buffer; and determining a correspondence relationship among the input data and the output result of each feature data, and determining the corresponding buffer and the corresponding cyclic addressing range as the buffer allocation relationship corresponding to the operation layer, wherein the determining the corresponding cyclic addressing range corresponding to each feature data in the corresponding buffer includes:

for each feature data, determining a start address for the input data and the output result of the feature data in the corresponding buffer, and determining a target data block obtained by splitting the feature data; and determining the corresponding cyclic addressing range corresponding to the feature data in the corresponding buffer based on the start address for the feature data and a size of the target data block.

12. The non-transitory computer-readable storage medium according to claim 11, in response to determining that the input data and the output results of a plurality of different feature data correspond to a same buffer, cyclic addressing ranges corresponding to the plurality of different feature data in the same buffer do not overlap with each other.

13. The non-transitory computer-readable storage medium according to claim 11, wherein the target data block is a largest data block among a plurality of data blocks obtained by splitting the feature data.

14. The non-transitory computer-readable storage medium according to claim 11, wherein the setting a first address range for cyclic addressing of a first buffer and a second address range for cyclic addressing of a second buffer based on a buffer allocation relationship which is pre-stored includes:

storing a cyclic addressing range, in the buffer allocation relationship, corresponding to the input data for the operation layer into a first storage space, to serve as the first address range for cyclic addressing of the first buffer; and storing a cyclic addressing range corresponding to the output result of the operation layer into a second storage space, to serve as the second address range for cyclic addressing of the second buffer, wherein the first storage space is used to store an address range for cyclic addressing for reading of the first buffer, and the second storage space is used to store an address range for cyclic addressing for writing of the second buffer.

\* \* \* \* \*